United States Patent

Schwartz et al.

[11] Patent Number: 6,157,167
[45] Date of Patent: Dec. 5, 2000

[54] TOPOLOGY FOR INDIVIDUAL BATTERY CELL CHARGE CONTROL IN A RECHARGEABLE BATTERY CELL ARRAY

[75] Inventors: Paul D. Schwartz, Thurmont, Md.; Binh Q. Le, Vienna, Va.; Ark L. Lew, Ellicott City; Joseph J. Suter, Clarksville, both of Md.

[73] Assignee: The Johns Hopkins University, Baltimore, Md.

[21] Appl. No.: 09/069,255

[22] Filed: Apr. 29, 1998

[51] Int. Cl.[7] ........................................ H02J 7/00
[52] U.S. Cl. ............................... 320/122; 320/116
[58] Field of Search .................... 320/116, 122, 320/118, 117, 120, 121, 119; 307/71; 361/54, 55, 56

[56] References Cited

U.S. PATENT DOCUMENTS

| | | | |
|---|---|---|---|
| 4,238,721 | 12/1980 | Deluca et al. | 320/122 |
| 4,303,877 | 12/1981 | Meinhold | 320/122 |
| 4,502,000 | 2/1985 | Mashikian | 320/122 |
| 4,564,798 | 1/1986 | Young | 320/103 |
| 4,651,253 | 3/1987 | Petri et al. | 361/55 |
| 4,879,188 | 11/1989 | Meinhold et al. | 429/7 |
| 5,488,282 | 1/1996 | Hayden et al. | 320/118 |
| 5,498,950 | 3/1996 | Ouwerkerk | 320/119 |
| 5,504,415 | 4/1996 | Podrazhansky et al. | 320/122 |
| 5,578,914 | 11/1996 | Morita | 320/122 |
| 5,644,209 | 7/1997 | Chabbert et al. | 320/122 |
| 5,666,040 | 9/1997 | Bourbeau | 320/122 |
| 5,675,233 | 10/1997 | Kaneko et al. | 320/122 |
| 5,677,613 | 10/1997 | Perelle | 320/122 |
| 5,744,936 | 4/1998 | Kawakami | 320/122 |
| 5,773,959 | 6/1998 | Merritt et al. | 320/120 |
| 5,783,928 | 7/1998 | Okamura | 320/122 |
| 5,894,212 | 4/1999 | Balogh | 320/122 |
| 5,920,179 | 7/1999 | Pedicini | 320/122 |
| 5,932,990 | 8/1999 | Kaneko | 320/122 |
| 5,952,815 | 9/1999 | Rouillard et al. | 320/122 |

*Primary Examiner*—Peter S. Wong
*Assistant Examiner*—Pia Tibbits
*Attorney, Agent, or Firm*—Francis A. Cooch

[57] ABSTRACT

A microprocessor-based charge control architecture which provides individual battery cell charge control in order to insure an equality of charge among all cells in a rechargeable battery cell array during a single charge cycle. The array is arranged in parallel strings with an identical number of cells in series in each string. The microprocessor controls the amount of charge current in each battery cell via a shunt element for each battery cell, and adjusts the shunt element to bypass a portion of the string current for each battery cell. The invention also permits charge control algorithms to be conveniently updated, provides individual cell coulometry, and autonomously monitors and corrects conditions which can result in battery failure. Any type of rechargeable battery cell and array size can be accommodated. The array size can be set to accommodate the specific voltage and load current requirements of each application.

4 Claims, 1 Drawing Sheet

TOPOLOGY FOR INDIVIDUAL BATTERY CELL CHARGE CONTROL IN A RECHARGEABLE BATTERY CELL ARRAY

This invention was made with Government support under Contract No. FA8002-96-C-0301 awarded by the Department of the Air Force. The Government has certain rights in the invention.

BACKGROUND OF THE INVENTION

The invention relates to secondary (rechargeable) battery cells and, more specifically, comprises a power management and battery charge control module/system which provides individual cell charge control for each battery cell in an array of such cells and establishes and maintains an equality of charge among all cells in the array.

In rechargeable battery cell arrays using new battery chemistries, e.g., lithium polymer and all polymer, the cells cannot be well matched and, hence, cells do not share charge equally. Such arrays require individual cell charge control to guarantee appropriate charge current sharing. What is required then, at a minimum, is a means for controlling the charge in each cell of a rechargeable battery cell array in a manner which establishes an equality of charge among all cells.

SUMMARY OF THE INVENTION

The invention solves the above problem through a microprocessor-based charge control architecture which provides individual battery cell charge control in a rechargeable battery cell array, permits charge control algorithms to be conveniently updated, provides individual cell coulometry, and autonomously monitors and corrects conditions which can result in battery failure. The invention works with any type of rechargeable battery cell and array size which can be set to accommodate the specific voltage and load current requirements of each application.

The invention has the following unique characteristics:

1. Since cell matching and current sharing are not characteristic of many battery chemistries, e.g., all polymer and lithium ion polymer batteries, provides individual control for all battery cells in an array by creating isolated battery cell strings and controlling the string currents and individual cell bypass currents to accomplish charge control, cell charge equalization, and charging source operating point control.

2. Accommodates charge control algorithms which can involve processing any combination of cell voltage, cell temperature, and cell charge/discharge current and which may require knowledge of the history of those parameters. The invention performs individual cell coulometry for charge state monitoring and charge control;

3. Provides fault monitoring and fault isolation including:

a. preventing a failed cell from shorting parallel cells during charge or discharge; and b. monitoring all cells to anticipate and prevent a reversed cell condition; and 4. Provides a digital diagnostic data output which describes the state of each battery cell.

DETAILED DESCRIPTION

Figure 1:
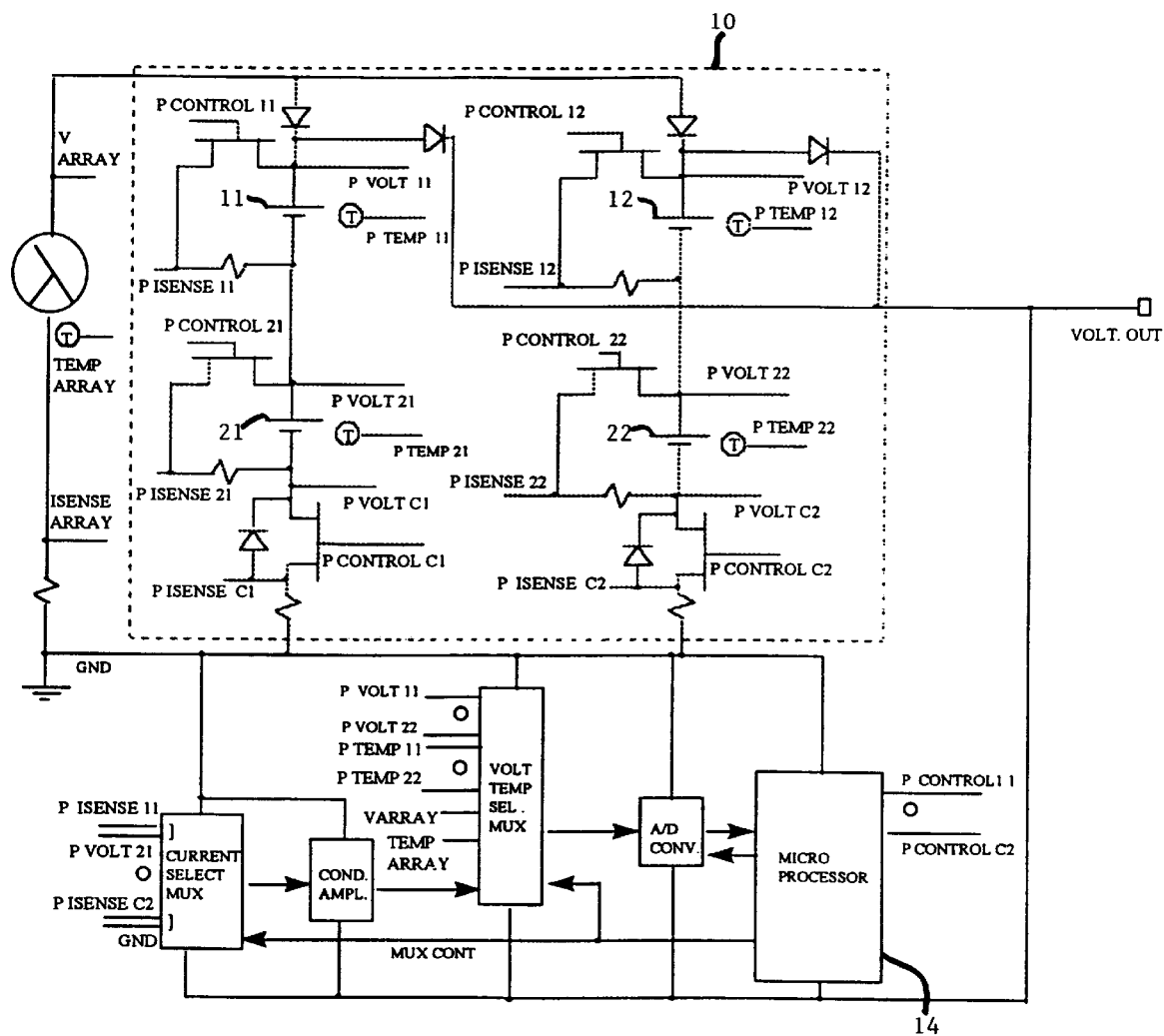
FIG. 1 illustrates a circuit diagram of a rechargeable battery two-cell by two-cell array embodiment of the invention.

The invention is illustrated in FIG. 1 as a rechargeable two-cell by two-cell battery array; however, the array size can be set to accommodate the specific voltage and load current requirements of each application. Any rechargeable battery cell, including but not limited to, all polymer and lithium ion polymer battery cells, can be used in the invention.

As shown in FIG. 1, a secondary (rechargeable) battery cell array 10 denoted by the dashed box comprises, in this example, four battery cells 11, 21, 12, 22 arranged in parallel strings 11–21, 12–22. Each string consists of an identical number (in this case two) of series cells. The microprocessor 14 continuously monitors individual battery cell voltages, charge/discharge currents, and cell temperature data, and solar array operating point data to determine the charge current for each battery cell. The charge current for each string is individually set by the microprocessor 14.

The microprocessor 14 sets individual battery cell charge currents by controlling the individual cell (field-effect transistor (FET)) shunt elements P CONTROL 11, P CONTROL 21, P CONTROL 12, P CONTROL 22 to bypass the appropriate portion of the string current for each battery cell. The microprocessor 14 also controls string current control elements P CONTROL C1, P CONTROL C2. In this manner, by controlling the string currents and individual cell bypass currents, the microprocessor 14 individually sets the charge current for each cell in each string and establishes an equality of charge among all cells. The array current operating point is controlled by microprocessor 14 adjustment of the sum of the string currents.

As noted above, the invention operates with any type of secondary (rechargeable) battery cells and accommodates any series and parallel cell configuration to allow for any desired value of composite battery voltage and current capacity. A significant benefit of the invention is that the microprocessor 14 can autonomously bypass individual failed battery cells and/or predict and correct conditions that can potentially result in battery cell voltage reversals, thereby insuring graceful degradation of the battery and survival of the composite power source.

The microprocessor 14 can be adapted for spaceflight applications by adding an interface between the microprocessor and a spacecraft data bus or dedicated serial I/O electronics. Coulometry data gathered by the microprocessor can be downlinked over the spacecraft interface to provide individual cell state of charge indicators. Charge control algorithms based on any combination of measured cell parameters, including coulometric data, can be easily uploaded over the data interface.

Thus, the invention controls individual cells in a battery cell array by creating isolated battery cell strings and controlling the string currents and individual cell bypass currents to accomplish charge control, cell charge equalization, and charging source operating point control.

We claim:

1. A system for continuously managing the charge in individual battery cells in a rechargeable battery cell array to establish an equality of charge among all cells during a single charge cycle, the system comprising:

a microprocessor for controlling the array;

a plurality of battery cells arranged in parallel strings, the cells being in series in each string, an identical number of cells being in each string;

a plurality of string current control elements being continuously dynamically controlled by the microprocessor during a single charge cycle; and a shunt element for each battery cell, the shunt element being continuously dynamically controlled by the microprocessor during a single charge cycle to bypass a portion of the string current for each battery cell;

whereby controlling the string currents and the bypass current for each battery cell, the microprocessor continuously adjusts the charge current for each battery cell in the array and establishes an equality of charge among all cells in the array during a single charge cycle.

2. The system as recited in claim 1, wherein the microprocessor adjusts the sum of the parallel string currents to control an array current operating point.

3. A method for continuously controlling the charge in individual battery cells in a rechargeable battery cell array and establishing an equality of charge among all cells during a single charge cycle, the method comprising the steps of:

arranging the battery cells in parallel strings, the battery cells being in series in each string, an identical number of battery cells being in each string;

continuously dynamically controlling the current in each string using a string current control element in each string under the control of a microprocessor; and continuously dynamically controlling a portion of the string current bypassing each battery cell during a single charge cycle using a shunt element in each battery cell under the control of the microprocessor;

wherein controlling the string currents and the bypass current for each battery cell, the microprocessor continuously adjusts the charge current for each battery cell in the array and establishes an equality of charge among all cells in the array during a single charge cycle.

4. The method as recited in claim 3 further comprising the step of adjusting the sum of the parallel string currents to control an array current operating point.

* * * * *